United States Patent
Felter et al.

(10) Patent No.: US 10,810,038 B2
(45) Date of Patent: *Oct. 20, 2020

(54) ACCOUNTING AND ENFORCING NON-PROCESS EXECUTION BY CONTAINER-BASED SOFTWARE RECEIVING DATA OVER A NETWORK

(71) Applicant: INTERNATIONAL BUSINESS MACHINES CORPORATION, Armonk, NY (US)

(72) Inventors: Wesley M. Felter, Austin, TX (US); Junaid Khalid, Madison, WI (US); Karthick Rajamani, Austin, TX (US); Eric Rozner, Austin, TX (US); Cong Xu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/712,198

(22) Filed: Sep. 22, 2017

(65) Prior Publication Data
US 2019/0095236 A1    Mar. 28, 2019

(51) Int. Cl.
*G06F 9/46* (2006.01)
*G06F 9/48* (2006.01)
(Continued)

(52) U.S. Cl.
CPC ............ *G06F 9/46* (2013.01); *G06F 9/45558* (2013.01); *G06F 9/4812* (2013.01); *H04L 47/00* (2013.01);
(Continued)

(58) Field of Classification Search
CPC . H04L 47/12; H04L 67/10; G06F 9/46; G06F 9/4812
See application file for complete search history.

(56) References Cited

U.S. PATENT DOCUMENTS 7,697,434 B1 * 4/2010 Tripathi ................ G06F 13/387
370/230
7,715,410 B2   5/2010 Nemirovsky et al.
(Continued)

FOREIGN PATENT DOCUMENTS

| CA | 2667163 C | 10/2012 |
| CN | 105138905 A | 12/2015 |
| WO | 2005116833 A1 | 12/2005 |

OTHER PUBLICATIONS

IBM, List of IBM Patents or Patent Applications Treated as Related, Appendix P, dated Dec. 28, 2017, 2 pages.
(Continued)

*Primary Examiner* — Tonia L Dollinger
*Assistant Examiner* — Jihad K Boustany
(74) *Attorney, Agent, or Firm* — Ewa M. Wozniak

(57) ABSTRACT

Utilizing a computing device to determine and enforce limits on cloud computing containers receiving data over a network. A determination is made of total container time remaining available for a first container to execute in a computing environment. Processor packet receipt time is determined for receiving and processing of a packet or a batch of packets via a network stack associated with the computing device. An updated total container time remaining is calculated for the first container accounting for the processor packet receipt time. The updated total container time remaining is enforced by dropping a subsequent packet or batch of packets received at the network stack if the updated total container time remaining is insufficient.

17 Claims, 7 Drawing Sheets

(51) Int. Cl.
  *H04L 29/08* (2006.01)
  *H04L 12/70* (2013.01)
  *G06F 9/455* (2018.01)
  *H04L 12/801* (2013.01)

(52) U.S. Cl.
  CPC .............. *H04L 67/10* (2013.01); *H04L 67/34* (2013.01); *H04L 69/30* (2013.01); *H04L 69/321* (2013.01); *G06F 2009/45595* (2013.01); *H04L 47/12* (2013.01)

(56) References Cited

U.S. PATENT DOCUMENTS

| | | | |
|---|---|---|---|
| 8,209,682 B2 | 6/2012 | Cherkasova et al. | |
| 8,214,495 B2 | 7/2012 | Alon et al. | |
| 9,058,198 B2 | 6/2015 | McGrath et al. | |
| 9,351,193 B2 | 5/2016 | Raleigh et al. | |
| 9,703,589 B2 | 7/2017 | Zheng et al. | |
| 2003/0214921 A1* | 11/2003 | Alapuranen | H04L 45/00 370/328 |
| 2004/0255295 A1 | 12/2004 | Stackhouse et al. | |
| 2006/0092840 A1* | 5/2006 | Kwan | H04L 47/10 370/230.1 |
| 2012/0079494 A1 | 3/2012 | Sandstrom | |
| 2014/0173614 A1* | 6/2014 | Konik | G06F 9/4881 718/104 |
| 2014/0219287 A1 | 8/2014 | Birke et al. | |
| 2015/0055499 A1* | 2/2015 | Zheng | G06F 9/45533 370/252 |
| 2015/0074676 A1* | 3/2015 | Maruyama | G06F 9/4881 718/103 |
| 2015/0281271 A1 | 10/2015 | Walsh | |
| 2016/0169948 A1 | 6/2016 | Thielen et al. | |
| 2016/0337465 A1* | 11/2016 | Tarre | H04L 67/2823 |
| 2017/0078453 A1 | 3/2017 | Stevens et al. | |
| 2017/0126432 A1 | 5/2017 | Padala et al. | |
| 2017/0169254 A1* | 6/2017 | Kumar | G06F 21/45 |
| 2017/0185450 A1 | 6/2017 | Le Bars et al. | |
| 2018/0262443 A1* | 9/2018 | Zhang | H04L 45/306 |

OTHER PUBLICATIONS

Pending U.S. Appl. No. 15/712,194, filed Sep. 22, 2017, entitled: "Accounting and Enforcing Non-Process Execution by Container-Based Software Transmitting Data Over a Network", 42 pages.

Pending U.S. Appl. No. 15/802,519, filed Nov. 3, 2017, entitled: "Accounting and Enforcing Non-Process Execution by Container-Based Software Transmitting Data Over a Network", 45 pages.

IBM, List of IBM Patents or Patent Applications Treated as Related, Appendix P, dated Sep. 22, 2017, 2 pages.

Pending U.S. Appl. No. 15/712,494, filed Sep. 22, 2017, entitled: "Accounting and Enforcing Non-Process Execution by Container-Based Software Transmitting Data Over a Network".

Pending U.S. Appl. No. 15/956,888, filed Apr. 19, 2018, entitled: "Accounting and Enforcing Non-Process Execution by Container-Based Software Transmitting Data Over a Network".

Pending U.S. Appl. No. 15/956,893, filed Apr. 19, 2018, entitled: "Accounting and Enforcing Non-Process Execution by Container-Based Software Transmitting Data Over a Network".

Pending U.S. Appl. No. 15/802,519, filed Nov. 3, 2017, entitled: "Accounting and Enforcing Non-Process Execution by Container-Based Software Transmitting Data Over a Network".

Pending U.S. Appication , filed , entitled: "Accounting and Enforcing Non-Process Execution by Container-Based Software Transmitting Data Over a Network", 42 pages.

McCullough et al., "Stout: An Adaptive Interface to Scalable Cloud Storage", Published in: Proceeding USENIXATC'10 Proceedings of the 2010 USENIX conference on USENIX annual technical conference pp. 47-74, Boston, MA, Jun. 23-25, 2010.

Thereska et al., "IOFlow: A Software-Defined Storage Architecture", SOSP'13, Nov. 3-6, 2013, ACM 978-1-4503-2388-Aug. 13, 2011, pp. 1-15.

Wachs et al., "Argon: Performance Insulation for Shared Storage Servers", 5th USENIX Conference on File and Storage Technologies (FAST'07), Feb. 13-16, 2007, San Jose, CA, pp. 1-16.

Yang et al., "Split-Level I/O Scheduling", SOSP'15, Oct. 4-7, 2015, ACM 978-4503-3834-Sep. 15, 2010, pp. 1-16.

Radhakrishnan et al., "SENIC: Scalable NIC for End-Host Rate Limiting", Proceedings of the 11th USENIX Symposium on Networked Systems Design and Implementation (NSDI'14), Apr. 2-4, 2014, pp. 1-15.

Banga et al., "Resource Containers: A new facility for resource management in server systems", Proceedings of the 3rd USENIX Symposium on Operating Design and Implementation (ODSI), Feb. 1999, pp. 1-15.

Matthews et al., "Quantifying the Performance Isolation Properties of Virtualization Systems", ExpCS'07, Jun. 13-14, 2007, Copyright 2007 ACM, pp. 1-9.

Druschel et al., "Lazy Receiver Processing (LRP): A Network Subsystem Architecture for Server Systems", Proceedings of the 2nd USENIX Symposium on Operating Systems Design and Implementation (ODSI), Oct. 1996, pp. 1-15.

Gupta et al., "Enforcing Performance Isolation Across Virtual Machines in Xen", M. van Steen and M. Henning (Eds): Middleware 2006, LNCS 4290, pp. 342-362, 2006.

Lo et al., "Heracles: Improving Resource Efficiency at Scale", ISCA'15, Jun. 13-17, 2015, ACM 2015, pp. 1-13.

Sharma et al., "Containers and Virtual Machines at Scale: A Comparative Study", Middleware '16, Dec. 12-16, 2016, Trento, Italy, ACM, pp. 1-13.

Ballani et al., "Towards Predicable Datacenter Networks", SIGCOMM'11, Aug. 15-19, 2011, Toronto, Ontario, Canada, Copyright 2011 ACM, pp. 1-12.

Jeyakumar et al., "EyeQ: Practical Network Performance Isolation at the Edge", USENIX Association, 10th USENIX Symposium on Networked Systems Design and Implementaion (NSDI '13), pp. 297-311.

Popa et al., "FairCloud: Sharing the Network in Cloud Computing", SIGCOMM'12, Aug. 13-17, 2012, Helsinki, Finland, Copyright 2012 ACM, pp. 1-12.

Popa et al., "ElasticSwitch: Practical Work-Conserving Bandwidth Guarantees for Cloud Computing", SIGCOMM'13, Aug. 12-16, 2013, Hong Kong, China, Copyright 2013 ACM, pp. 351-362.

Rodrigues et al., "Gatekeeper: Supporting Bandwidth Guarantees for Multi-tenant Datacenter Networks", WIOV 2011, Portand, OR, pp. 1-37.

Greenberg, "Seawall: Performance Isolation for Cloud Datacenter Networks", ResearchGate, http:www.researchgate.net/publication/234793767, Jan. 2010, pp. 1-8.

Jeong et al., "mTCP: a Highly Scalable User-level TCP Stack for Multicore Systems", Proceedings fo the 11th USENIX Symposium on Networked Systems Design and Implementation (NSDI'14), https://www.usenix.org/conference/nsdi14/technical-sessions/presentation/jeong,Apr. 2-4, 2014, pp. 1-15.

Peter et al., "Arrakis: The Operating System is the Control Plane", Proceedings of the 11th USENIX Symposium on Operating Systems Design and Implementation, Oct. 6-8, 2014, https://www.usenix.org/conference/osdi14/technical-sessions/presentation/peter, pp. 1-17.

Delimitrou et al., "Paragon: Qos-Aware Scheduling for Heterogeneous Datacenters", ASPLOS'13, Mar. 16-20, 2013, Copyright 2013 ACM, pp. 1-12.

Delimitrou et al., Quasar: Resource-Efficient and Qos-Aware Cluster Management, ASPLOS'14, Mar. 1-5, 2014, ACM, pp. 1-17.

Mace et al., "Retro: Targeted Resource Management in Multi-tenant Distributed Systems", Porceedings of the 12th USENIX Symposium on Networked Systems Design and Implementation (NSDI'15), May 4-6, 2015, https://www.usenix.org/conference/nsdi15/technical-sessions/presentation/mace, pp. 1-16.

Verma et al., "Large-scale Cluster Management at Google with Borg", EuroSys'15, Apr. 21-24, 2015, ACM, pp. 1-18.

(56) References Cited

OTHER PUBLICATIONS

Bartolini et al., "Automated Fine-Grained CPU Provisioning for Virtual Machines", ACM Transactions on Architecture and Code Optimization, vol. 11, No. 3, Article 27, Publication date: Jul. 2014, pp. 1-25.

Guo et al., "SecondNet: A Data Center Network Virtualization Architecture with Bandwith Guarantees", ACM CoNEXT 2010, Nov. 30-Dec. 3, 2010, pp. 1-12.

Turner et al., "CPU Bandwidth Control for CFS", 2010 Linux Symposium, pp. 245-254.

Cherkasova et al., "Comparison of the Three CPU Scheduliers in Xen", ACM, http://dl.acm.org/citation.cfm?id=1330556, 2007, pp. 1-12.

Mell et al., "The NIST Definition of Cloud Computing", National Institute of Standards and Technology, Special Publication 800-145, Sep. 2011, pp. 1-7.

Disclosed Anonymously, "Method for Packet Combining in Network Processors", IP.com No. IPCOM000151848D, IP.com Electronic Publication Date: Apr. 23, 2007, pp. 1-7.

Disclosed Anonymously, "Method to Enable Receive Packet Steering to Multicore for a Single Elephant Flow", IP.com No. IPCOMM000236758D, IP.com Electronic Publication Date: May 14, 2014, pp. 1-6.

Disclosed Anonymously, "A System and Method for Software Defined Congestion Controlled Reliable Multicast Communication in the Cloud", IP.com No. IPCOMM000246048D, IP.com Electronic Publication Date: Apr. 29, 2016, pp. 1-12.

Kaufmann et al., "High Performance Packet Processing with FlexNIC", ASPLOS '16 Apr. 2-6, 2016, Atlanta, Georgia, USA, ACM 978-1-4503-4091-May 16, 2004, pp. 1-15.

Motorola et al., "Method to Handle Burst Packets Using Secondary Buffers", IP.com No. IPCOM000011704D, IP.com Electronic Publication Date: Mar. 11, 2003, pp. 1-6.

Disclosed Anonymously, "Method for an In-line Computation Engine in the I/O-to-memory Data Path", IP.com No. IPCOM000125748D, IP.com Electronic Publication Date: Jun. 15, 2005, pp. 1-11.

Disclosed Anonymously, "Service Aware Tail Dropping of Packets at the Egress Queue", IP.com No. IPCOM000245535D, IP.com Electronic Publication Date: Mar. 15, 2016, pp. 1-10.

Sarkar et al., "Scheduling for Fair Allocation of Rates in Multirate Multicast Networks", ISIT 2000, Sorrento, Italy, Jun. 25-30, 2000, IEEE, p. 107.

Shieh, "Side Car: Building Programmable Datacenter Networks without Programmable Switches", Hotnets '10, Oct. 20-21, 2010, Monterey, CA, USA, Copyright 2010 ACM 978-1-4503-0409-Feb. 10, 2010, pp. 1-6.

Perlow, "Containers: Fundamental to the Cloud's Evolution", ZDNet, http://www.zdnet.com/article/containers-fundamental-to-the-evolution-of . . . , printed on Aug. 10, 2017, pp. 1-9.

\* cited by examiner

ACCOUNTING AND ENFORCING NON-PROCESS EXECUTION BY CONTAINER-BASED SOFTWARE RECEIVING DATA OVER A NETWORK

BACKGROUND

The present invention relates generally to the field of utilization of cloud computing resources, and more particularly to accounting and enforcing limits for container-based software receiving data over a network.

BRIEF SUMMARY

Embodiments of the present invention disclose a method, system, and computer program product for utilizing a computing device to determine and enforce limits on cloud computing containers receiving data over a network. A total container time remaining available for a first container to execute in a computing environment is determined. A processor packet receipt time for receiving and processing of a packet or a batch of packets via a network stack associated with the computing device is determined. An updated total container time remaining is calculated for the first container accounting for the processor packet receipt time. The updated total container time remaining is enforced by dropping a subsequent packet or batch of packets received at the network stack if the updated total container time remaining is insufficient.

DETAILED DESCRIPTION

Figure 1:
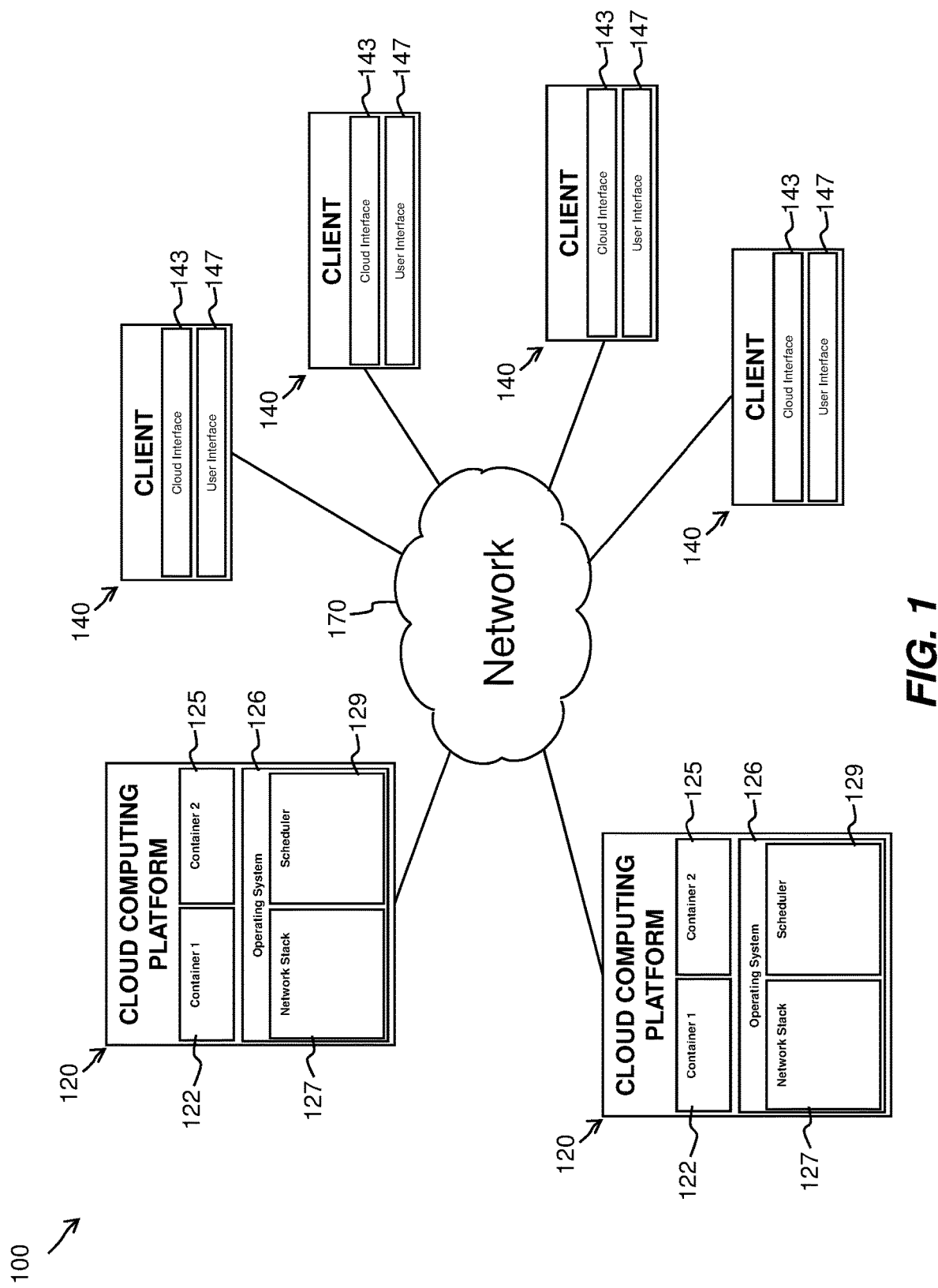
FIG. 1 is a functional block diagram illustrating an environment for accounting and enforcing non-process execution by container-based software receiving data over a network, in accordance with an embodiment of the present invention.

Containers are increasing in popularity as a mechanism to provide cloud computing processes, applications, and services to cloud tenants, in contrast to previously offered virtual machine-based cloud computing. Containers, unlike virtual machines, share the same underlying operating system and system resources, presenting the advantage of rapid provisioning, instantiation, and migration, as well as allowing more containers to execute on a system than one utilizing virtual machines. Sharing the same operating system and system resources, however, presents the disadvantage of making containers more difficult to isolate from other containers concurrently executing on the same hardware operating system.

Isolation between containers is necessary to maintain the security of data residing in the container of one cloud tenant, from access by other cloud tenants utilizing the same hardware. Isolation between containers is also important in the context of accounting for usage of system resources by one container versus usage of system resources by other containers executing on the same hardware, as well as correctly enforcing limits on usage of system resources by each container. The "control groups" (or "cgroups") feature in Linux (or comparable features in other operating systems), for example, allocates a percentage of CPU time, system memory, secondary storage, disk I/O, network bandwidth, etc., or other system resources to each container concurrently executing for the purposes of accounting for usage of system resources and enforcing limits on usage of system resources. For example, if two containers are executing on the same hardware, each container may be provisioned to have access to 50% of the system resources across a timeframe (or a "process period") or some other unequal allotment scheme.

Unfortunately, because of the nature of the operating system framework that the containers run within, usage of system resources by a container may be incorrectly accounted for in certain circumstances. This violates isolation, which is crucial for the success of multiple containers operating on a cloud computing platform operated for multiple cloud tenants. If, for example, when a container is executing within the "process context," (and executing software residing within the container, including processes, applications, services, etc.), the direct or indirect actions of another container may cause execution to pause and switch to "non-process context" execution (such as, for example, because the operating system receives an interrupt on behalf of another container indicating receipt of data or because a kernel thread (such as ksoftirqd) is executing an excess interrupt on behalf of another container).

When these situations occur, incorrect accounting for usage of system resources may occur as a result, with the container executing in process context when the interrupt is received being incorrectly charged for time spent network processing or when a kernel thread executes, and thus the receiving container is not charged for the non-process execution that occurs. When non-process execution is complete, execution switches back to process execution, but accounting for usage of system resources may be incorrect, with usage of system resources being accounted for and charged to the container executing when the interrupt was received. Accordingly, when enforcement of limits on execution are enforced, they may be enforced unfairly on containers which have been accounted for incorrectly, with containers unfairly throttled before the end of the process period.

Presented is a method, system, and computer program product to account and enforce process as well as non-process execution by container-based software receiving data over a network. The present invention offers the advantage of better accounting and enforcing both process and non-process execution by containers, considering the true usage of system resources utilized by each container in the operating system of the underlying hardware.

FIG. 1 is a functional block diagram illustrating an environment for accounting and enforcing non-process execution by container-based software receiving data over a network 100, in accordance with an embodiment of the present invention. In an exemplary embodiment, included in the environment 100 are one or more cloud computing platforms 120 and one or more clients 140 of cloud computing platforms 120, all connected via a network 170. In various embodiments, the network 170 may be any combination of connections and protocols that will support communications between cloud computing platforms 120 and clients 140. In various embodiments, network 170 represents, for example, an internet, a local area network (LAN), a wide area network (WAN) such as the internet, and includes wired, wireless, or fiber optic connections. In various embodiments, each of cloud computing platform 120 and client 140 may be, for example, a mainframe or a mini computer, a laptop, a tablet, a netbook personal computer (PC), a mobile device (such as a cell phone or portable data assistant), a desktop computer, or any sort of computing platform possessing sufficient processing power to perform the required functionality in accordance with the embodiment, including execution of the container-based software described above and below.

Each cloud computing platform 120 and client 140 may include internal and external hardware components as depicted and described in further detail below with reference to FIG. 4, below. In other embodiments, each of cloud computing platform 120 and client 140 may be implemented in a cloud computing environment, as described in relation to FIGS. 5 and 6 below.

As displayed in FIG. 1, each cloud computing platforms 120 may execute a first container 122, a second container 125, and one or more additional containers (not shown). Each container 122, 125 is a software construct allowing processes, services, applications, etc. of cloud tenants to execute in an isolated, discrete environment, free from access and interference by other cloud tenants utilizing the same cloud computing platform 120. Containers 122, 125 present the advantage of very fast provisioning, as well as not utilizing a significant amount of system resources, allowing a large number of containers 122, 125 to exist (although only two containers 122, 125 are shown executing in each cloud computing platform 120, it is possible to provision a large number as needed). Fast provisioning offered by each container 122, 125 allows rapid multiplication of containers 122, 125 or migration of containers 122, 125 from one cloud computing platform 120 to another cloud computing platform 120 to better service clients 140. Each client 140 accesses the network 170 and cloud computing platforms 120 via each client's 140 cloud interface 143. Users of each client 140 utilize a user interface 147 for access.

The containers 122, 125 operating on any one cloud computing platform 120 share an operating system 126 which performs, for example, necessary computer resource allocation, job control, input/output control (including processing network traffic as further discussed herein), servicing interrupts, network function virtualization, file management, etc., as well as provides resource isolation to system resources for each container 122, 125. Each container 122, 125 on cloud computing platform 120 may execute over multiple cores of the cloud computing platform 120. Containers 122, 125 are utilized in the presently disclosed invention in contrast to virtual machines, which each contain a version of the operating system within the virtual machine itself.

Relevant portions of the operating system 126 include a network stack 127 and a scheduler 129. The network stack 127 is responsive for transmission of and receipt of data between each cloud computing platform 120 and each container 122, 125, as further discussed above and below. The scheduler 129 performs necessary tasks in accounting and enforcement of accounting for usage of system resources by the containers 122, 125, also as further discussed above and below.

Figure 2:
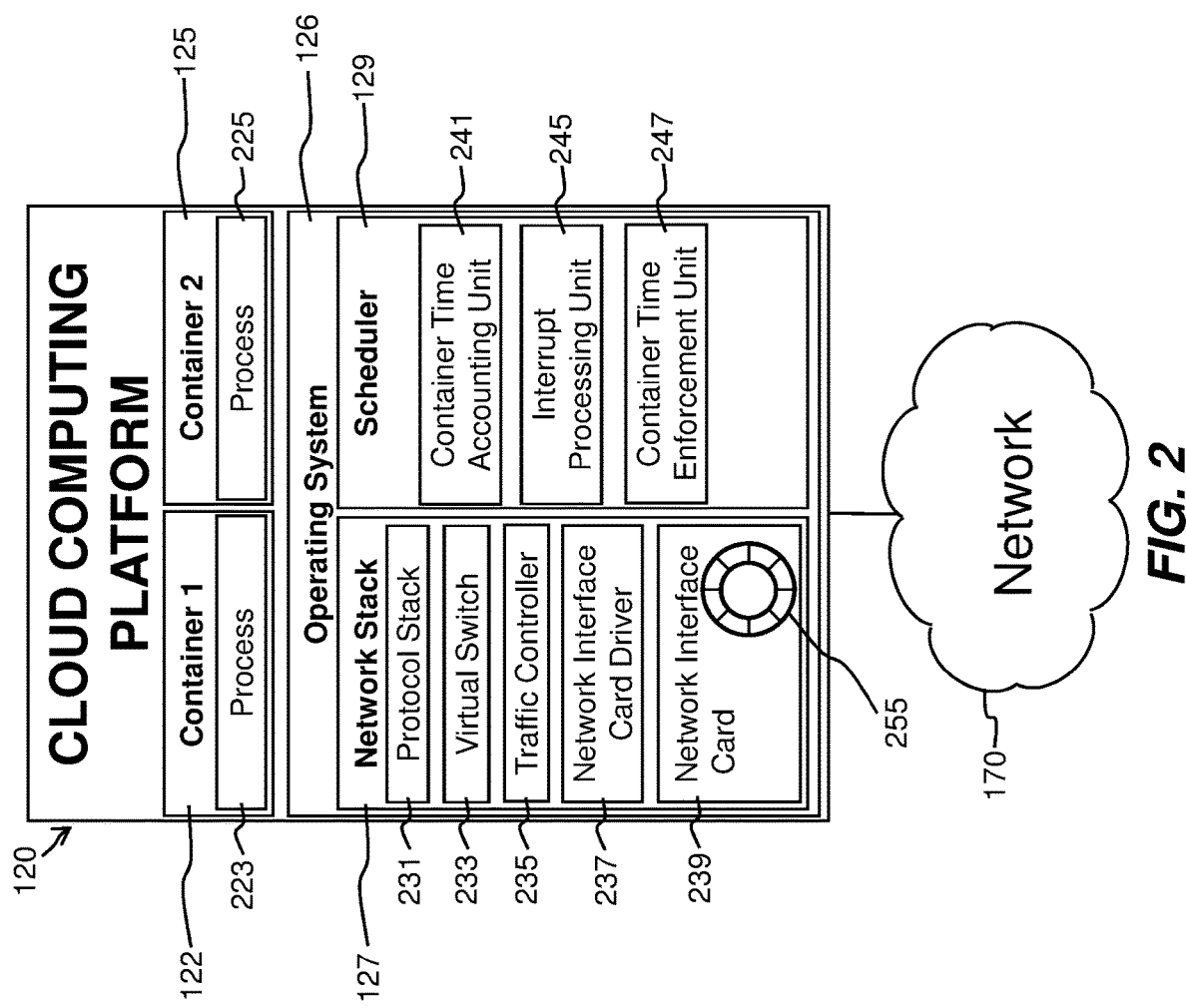
FIG. 2 is a functional block diagram illustrating a cloud computing platform executing a first container and a second container on a shared operating system, in accordance with an embodiment of the present invention.

FIG. 2 is a functional block diagram illustrating a cloud computing platform 120 executing a first container 122, and a second container 125 on a shared operating system 126, in accordance with an embodiment of the present invention. The cloud computing platform 120 is connected to the network 170. Each container 122, 125 is displayed to have a process 223, 225 executing within the bounds of the container 122, 125. Processes 223, 225 executing in the containers 122, 125 may be any type of software which would benefit from the advantages of deployment in the containers 122, 125, such as an application, a service, a database, a daemon, or any other type of software (or multiple types of software executing together).

Each container 122, 125 may be provisioned to have equal access rights to system resources or unequal access rights to system resources, with one of the containers 122, 125 entitled to a greater portion of system resources and the other container 122, 125 entitled to a lesser portion of system resources (system resources including one or more of CPU time, system memory, secondary storage, disk I/O, network bandwidth, etc.) provided by the cloud computing platform 120. In the case of provisioning with equal access rights for each container 122, 125, if there are n containers executing on the cloud computing platform 120, each of the n containers may be entitled to 1/n of total processor time, memory, secondary storage, and/or other system resources available. As there are two containers 122, 125 provisioned on cloud computing platform 120, each is entitled to 50% of system resources available within the cloud computing platform 120. In the case of provisioning with unequal access rights to system resources, other allotment schemes also specifically contemplated, including uneven schemes (such as, for example, container 122 entitled to 25% of the system resources and container 125 entitled to 75% of the system resources, schemes based upon needs of the cloud tenant, schemes based upon availability in public/private/hybrid cloud, etc.).

The processes 223, 225 located in containers 122, 125 each execute via one or more processor threads in the cloud computing platform 120 (not shown here), allowing for execution of multiple tasks simultaneously (or nearly simultaneously) in the cloud computing platform (as this is understood by one of skill in the art). Each process thread executing may utilize one core of a multi-core system associated with the cloud computing platform 120. Usage of systems resources for each container 122, 125 is accounted for and "charged" towards a total allotment allowed for each container based upon system resources utilized during a "process period" (a set period of time based upon which the cloud computing platform 120 executes). At the end of each process period, the total allotment for each container 122, 125 is re-charged.

Although only one process 223, 225 is displayed as located in each container 122, 125 each container 122, 125 may have multiple processes executing across multiple cores of a multi-core system. In such circumstances, each process of multiple processes is accounted for and charged individually as it executes across the multiple cores within the containers 122, 125, but execution of all processes within each container 122, 125 is summed and the container 122, 125 may be accounted for as a whole (and correspondingly the usage enforced, etc.).

Operating system 126 operates independently from containers 122, 125. Operating system 126 consists of a network stack 127 and a scheduler 129, as well as other elements. The network stack 127 is responsible for sending and receiving data in the form of packets via the network 170, as well as the processing of such data, as further described below. The scheduler 129 is responsible for scheduling functions and threads that help send and receive network data, accounting for usage of system resources by the containers 122, 125, and enforcing limits on usage of system resources by the containers 122, 125, also as further described below.

The network stack 127 comprises a protocol stack 231, a virtual switch 233, a traffic controller 235, a network interface card driver 237, and a network interface card 239 for communication with the network 170. A ring buffer 255 associated with the network interface card 239 is also displayed. Various layers 231-239 may be substituted or combined for various reasons, in accordance with the needs of the particular cloud computing platform 120 and containers 122, 125, as well as because of particularities of the network 170. Alternately, some layers 231-239 may be absent entirely. The network stack 127 may be implemented in Linux®, or any other appropriate operating system 126.

In the context of receiving of data, the network 170 transmits data to cloud computing platform 120, ultimately destined for process 223 or process 225 in containers 122, 125. The network interface card 239 receives the data as a physical signal from the network 170, and in combination with the network interface card driver 237, performs the function of actually receiving the data from the network 170 for intended recipient in the cloud computing platform 120. Data moves up the network stack 127 from the network interface card driver 237 to the traffic controller 235. The traffic controller 235 may be implemented as a first-in/first-out queue or another manner, but in a preferred embodiment is implemented with Linux® qdisc/tc, for scheduling receipt among all containers 122, 125, with the aim of prioritizing receipt speed, queuing, traffic control, and other factors, as appropriate.

The data travels from the traffic controller 235 to the virtual switch 233. The virtual switch 233 may be implemented in software such as Open VSwitch by the by the Linux Foundation®, or the equivalent. From the virtual switch 233, data travels to the protocol stack 231. The protocol stack 231 receives data in the form of TCP/IP, UDP, or any other appropriate communication protocol from the virtual switch 233. The data is destined for destinations such as process 223 or process 225 in containers 122, 125. The appropriate process 223, 225 receives the data via a socket available in a programming language from the network stack 127.

In the present invention, the network interface card driver 237 may attach a timestamp upon the arrival of each packet of data at the network interface card driver 237. The network interface card driver 237 (or another part of network stack 127) may also attach a process identification indicating which process 223, 225 the packet of data is destined for in cloud computing platform 120.

In the present invention, the traffic controller 235 may serve to also add a container ID identifying the container 122, 125 or the process ID identifying the process 223, 225 for which each packet is destined to the packet's data structure. The container ID or process ID is utilized for correctly accounting and enforcing usage of system resources by each container 122, 125 as each packet is received by the network stack 127, as further described herein. Alternately, another portion of the operating system 126 may perform the function of adding the container ID or process ID to each packet for correct accounting and enforcement. The traffic controller 235 (or other portion of the network stack 127 which serves to add the container ID or process ID to each packet) may utilize a hash table which maps source IP address or source MAC address of received packets to destination container ID to correctly perform this function. Alternately, the traffic controller 235 (or other portion of the network stack 127) may utilize a socket interface in the kernel of operating system 126 to obtain the container ID each packet is destined for when a process 223, 225 within containers 122, 125 retrieves a packet from a socket.

The scheduler 129 comprises a container time accounting unit 241, an interrupt processing unit 245, and a container time enforcement unit 247. The scheduler 129 may integrate with the network stack 127 and other aspects of the operating system 126 in performing its various functions, with the scheduler 129 acting as a light-weight add-on to any appropriate operating system 126, or optionally replacing relevant portions of the operating system 126.

The container time accounting unit 241 continuously determines and accounts for a total container time remaining available for the first container 122, the second container 125, and every other container executing in the cloud computing platform 120, and maintains each total container time remaining as a variable, data structure, object, tuple, or any other equivalent means of maintaining data on a computing device. The total container time remaining is simply available processor time remaining for each container 122, 125 to execute processes 223, 225 contained within across a process period. The total container time remaining is calculated individually for each container 122, 125. At the end of each process period, each total container time remaining variable is "refilled" to its original state. If cgroups is utilized in provisioning containers 122, 125, the cpu.cfs_quota_us parameter is utilized to define total container time remaining across a process period for each container 122, 125 in microseconds, and the process period is defined via a cpu.cfs_period_us parameter, also in microseconds.

The container time accounting unit 241 may determine the total container time remaining available for each container 122, 125 by individually accounting for receipt of data by each process 223, 225 executing within each container 122, 125 and other processes executing within each container (not shown), and summing all these to account for usage of each container 122, 125.

The container time accounting unit 241 also serves to calculate an updated total container time remaining for each container 122, 125 accounting for the processor packet receipt time as receipt occurs, as further discussed below.

The container time accounting unit 241 dynamically or periodically reviews actions of the network stack 127 in determining a processor packet receipt time necessary for receiving and processing of a packet or a group of packets from the network 170 to the correct process 223, 225 via the network stack 127, and maintains this information as a variable, data structure, object, tuple, or any other equivalent means of maintaining data on a computing device. The actual receipt occurs via the network stack 127 on a multi-core processor associated with the cloud computing platform 120.

The container time accounting unit 241 may determine the processor packet receipt time on a per-packet basis, a sampling per-queue basis, a per-flow basis, a per-container basis, a per-core basis, and a per-tenant basis. The container time accounting unit 241 may rely, for example, on kernel instrumentation of the operating system 126 in performing these tasks such as by, for example, reviewing a timestamp of a packet at a certain point in the network stack 127 (such as when the packet is at the traffic controller 235), then determining how long an interrupt which has indicated receipt of the packet was running, and utilizing this information to determine processor receipt time. The term "interrupt" as used herein may refer to any "hard" or "soft" interrupt, as these terms are understood by one of skill in the art.

The container time accounting unit 241 may determine the processor packet receipt time for receiving and processing of a packet or a batch of packets by utilizing a recorded time for receiving of a previously received batch of packets, divides the recorded time for the receiving by a number of the previously received batch of packets, and generates a per-packet estimated receipt time to determine the processor packet receipt time. This may be determined on a per-core basis.

The container time accounting unit 241 may utilize the net_receive_skb function to obtain a start time and an end time for receiving and processing individual packets (discounting interrupts processed in the interim), and then utilizing the calculated difference to calculate the per-packet estimate. Since interrupts may be processed in the interim between the start time and the end time for receiving and processing individual packets, the function starttime=current.sum_exec_runtime+(local_clock( )−current.exec_start) may be used by the container time accounting unit 241 to calculate the actual time for receiving and processing individual packets. The following assumes the individual packet being analyzed is destined for process 223 of container 1 122. The container time accounting unit 241 of scheduler 129 utilizes sum_exec_runtime as the cumulative running time the process 223 has been running when receiving and processing the individual packet. The exec_start is the time when the current process 223 was most recently swapped in, and local_clock is the current time. When the process 223 currently handling a packet is swapped out, the scheduler 129 retrieves an updated sum_exec_runtime with however long the process had been running for. When the process is swapped back in, exec_start is updated with the local time. To obtain the end time, the same equation above is used. Then the total cost of processing the packet is simply endtime−starttime.

The container time accounting unit 241 may consider both a fixed cost associated with processing network traffic as well as a cost per packet (as further described above and below) in determining processor packet receipt time for receiving and processing of the packet or batch of packets. Fixed costs may be associated, for example, with processing of the packet or the batch of packets may be, for example, overhead for entering the function that processes hard interrupts (such as in Linux®, do_IRQ) or soft interrupts (such as in Linux®, HI_SOFTIRQ, TIMER_SOFTIRQ, NET_TX_SOFTIRQ, NET_RX_SOFTIRQ, SCSI_SOFTIRQ, and TASKLET_IRQ), overheads associated with garbage collection, etc. The total fixed cost, after determination by the container time accounting unit 241 may be divided by the number of packets transmitted during the period considered, to obtain a fixed cost per packet, $O_{RX}$. The container time accounting unit 241 may therefore may utilize both the cost per packet as well as the fixed cost associated with processing network traffic in determining processor packet receipt time. The fixed cost may also cover TCP overhead, i.e. transmission of ACK messages after each packet is received in the case of receipt of TCP/IP data. The container time accounting unit 241 may take account of any or all of these in determining processor packet receipt time.

The container time accounting unit 241 may utilize the container ID or the process ID added to each packet in determining the processor packet receipt time directly on a per-packet basis. Alternately, the container time accounting unit 241 may track via a variable, data structure, object, tuple, or any other equivalent means of maintaining data on a computing device, utilization of each core of a multicore system by each container 122, 125, followed by summing all usage of each core by individual containers in determining the processor packet receipt time. If, for example, container 122 utilizes core 1 of a multicore system for 10 ms over a process period to receive data, and core 2 of the multicore system for 10 ms to receive data, container 122 may be charged a total of 20 ms towards its updated total container time remaining). Many specific methodologies of obtaining the processor packet receipt time by the container time accounting unit 241 are contemplated (such as, for example, simply utilizing a fixed per-packet cost for processor packet receipt time).

The interrupt processing unit 245 utilizes information provided by interrupts requested by the various containers or the operating system or hardware 122, 125, as the interrupts are handled by the operating system 126. For example, as the cloud computing platform 120 executes, the interrupt processing unit 245 determines how long an interrupt has been running in order to determine, in conjunction with the container time accounting unit 241, the processor packet receipt time for further use as described.

The interrupt processing unit 245 also serves, in conjunction with the container time accounting unit 241 to correctly account for non-process execution by each process 223, 225 executing in the cloud computing platform 120. For example, as process 225 is executing within the bounds of the second container 125, the container time accounting unit 241 accounts for process execution by process 225. If, however, an interrupt is received by the operating system 126 on behalf of the process 223 executing within first container 122 indicating receipt of a packet or a batch of packets on behalf of the process 223, non-process execution in network stack 127 out of the bounds of the second container 125 is required. The interrupt processing unit 245 takes account of which container 122 has received the interrupt indicating receipt of data, in this example the second container 125. As the cloud computing platform 120 pauses execution of the second container 125 and switches execution to process the interrupt to receive and process the subsequent packet or batch of packets at the network stack on behalf of the first container 122, the interrupt processing unit 245 determines an amount of processor time necessary for receiving and processing of the packet or batch of packets. The container time accounting unit 241 may utilize information regarding the amount of processor time necessary, and/or information provided by the container time accounting unit 241 in correctly accounting for process and non-process execution by each container 122, 125.

The interrupt processing unit 245 may also correctly account for kernel thread operation on behalf of the first container 122, in the case when execution switches from the second container 125 in order for the kernel thread to process interrupts received on behalf of the first container 122. In this example, a interrupt may received on behalf of the first container 122 indicating receipt of a subsequent packet or batch of packets via the network stack 127 when the second container 125 is executing in process context, but if the operating system 126 is overly busy or it is determined it will take too much time to process all outstanding interrupts, the interrupt may not be processed immediately, leading to a daemon associated with each core (such as ksoftirqd) to receive the subsequent packet or batch of packets on behalf of the first container 122, so as to avoid failure or delay. The interrupt processing unit 245 in conjunction with the container time accounting unit 241 correctly accounts for the subsequent packet or batch of packets processed by the kernel thread in these circumstances. The interrupt processing unit 245 in conjunction with the container time accounting unit 241 serves to correctly account for receiving and processing of a packet or a batch of packets even if a single kernel thread processes packets destined for multiple different containers 122, 125 in a single execution.

The container time enforcement unit 247 in conjunction with the containing time accounting unit 241 and other functionality within the scheduler 129 enforces the updated total container time remaining to each container 122, 125 (after determination by the container time accounting unit 241) by dropping a subsequent packet or batch of packets received at the network stack if the container time accounting unit 241 determines updated total container time remaining for each container 122, 125 is insufficient. In practice, dropping the subsequent packet or batch of packets may simply involve overwriting subsequent packets or batches of packets received at ring buffer 255 from the network 170, before they are processed by network stack 127. If the subsequent packet or batch of packets are not dropped, they may be alternately processed more slowly or buffered for processing at a later time. In cgroups, a runtime_remaining variable may be utilized in tracking the updated total container time remaining for each container 122, 125.

The ring buffer 255 may be implemented on the network interface card 239 (as displayed in FIG. 2), implemented in host memory of the cloud computing platform 120 (not shown), or in a shared region between the two. Although only one ring buffer 255 is displayed, one or multiple ring buffers 255 per container 122, 125 may be available. As packets are received from network 170, the network interface card 239 (or another portion of network stack 127) inserts received packets into the ring buffer 255 associated with the container 122, 125 the packet is destined for. Packets in ring buffer 255 may be serviced through a polling mechanism when packet arrival rates are high, and through an interrupt-driven mechanism when packet arrival rate are low. An example of this behavior is the new API (NAPI) in the current Linux kernel. When a container 122, 125 has consumed its available runtime, the container time enforcement unit 247 may disable polling from the kernel, leading to the kernel not polling further packets from the ring buffer 255. Packets subsequently arriving fill up the ring buffer 255 and eventually overwrite the data available. When containers 122, 125 are refilled, polling on the ring buffer is re-enabled and network processing resumes.

If the number of ring buffers 255 available is less than the number of containers 122, 125, the network stack 127 may dynamically associate containers 122, 125 to ring buffers 255. Containers 122, 125 with high rates of network traffic may be assigned their own ring buffer 255, while containers 122, 125 with little network traffic may share a ring buffer 255 (as shown in FIG. 2). Alternately, containers 122, 125 may be mapped to ring buffers 255 based on priority, customer policy, available runtime remaining, or other metrics as understood by one of skill in the art.

The determination of whether the updated total container remaining is insufficient may occur before or after receipt of the subsequent packet or batch of packets. If the container time accounting unit 241 calculates the updated container time remaining after receipt of the subsequent packet or batch of packets on behalf of the first container, and after receipt the updated total container time remaining is insufficient (i.e. the updated total container time remaining is too low to receive), the container time enforcement unit 247 may enforce the updated total container time remaining by utilizing accelerated receive flow steering or other network interface card driver 237 mechanism to steer or drop a further subsequent packet or batch of packets.

If the container time accounting unit 241 calculates the updated container time remaining before receipt of the subsequent packet or batch of packets on behalf of the first container, and before receipt the updated total container time remaining is insufficient (i.e. the updated total container time remaining is too low to receive the packet or the batch of packets), the container time enforcement unit 247 may enforce the updated total container time remaining by dropping the subsequent packet or batch of packets received at the network stack 127 by, for example, overwriting packets received at ring buffer 255.

The container time enforcement unit 247, alternately or in addition to functionality as described above, may serve to enforce the updated container remaining by transmitting a notification to the transmitter of the packet or the batch of packets, the notification indicating to the transmitter to slow or stop further transmission until the updated total container time remaining is refilled. The notification may also indicate an appropriate data rate for the transmitter to transmit based upon updated container time remaining for each container 122, 125.

Figure 3A:
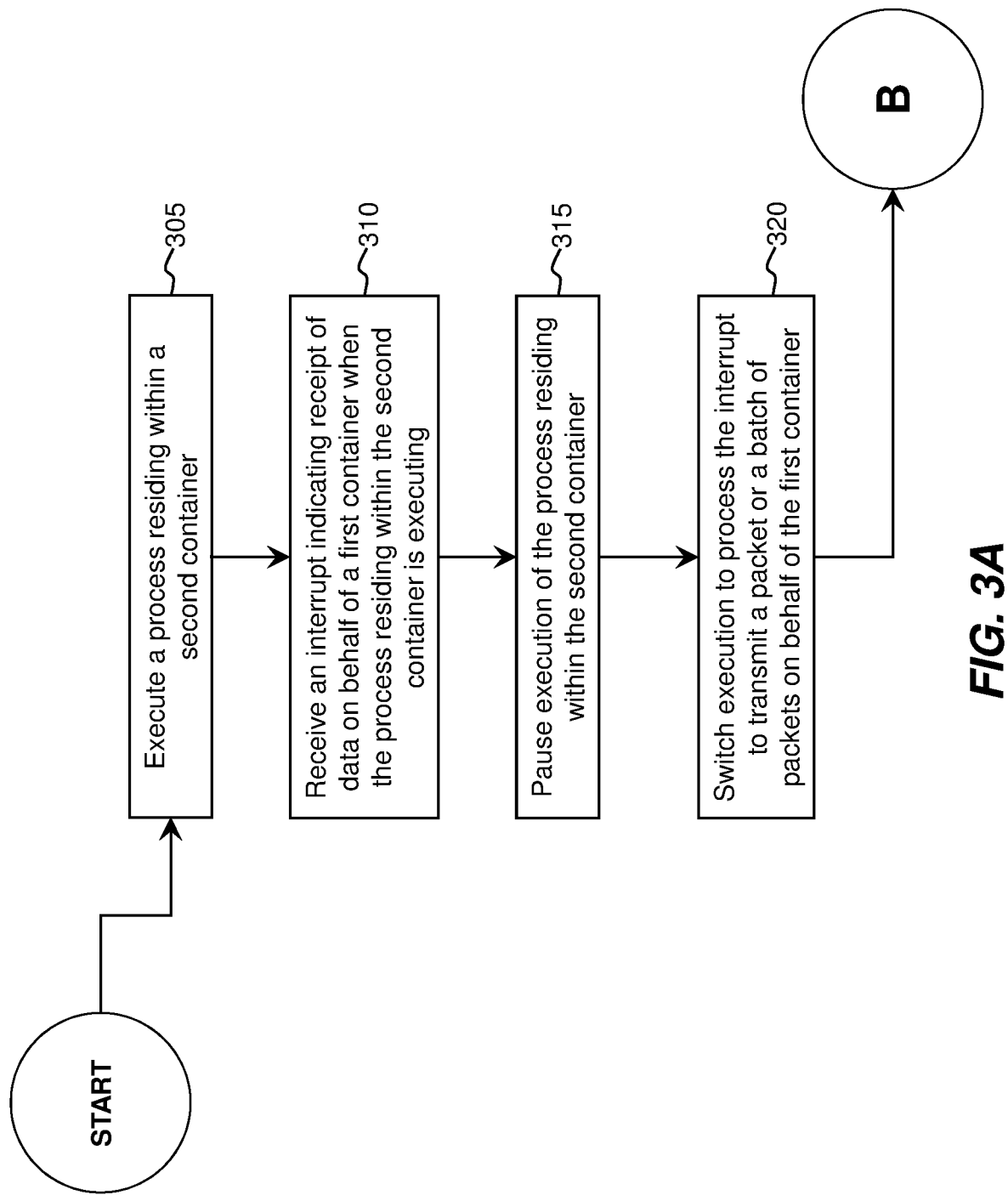
FIGS. 3A and 3B are a flowchart depicting operational steps that a hardware component, multiple hardware components, and/or a hardware appliance may execute, in accordance with an embodiment of the invention
Figure 3B:
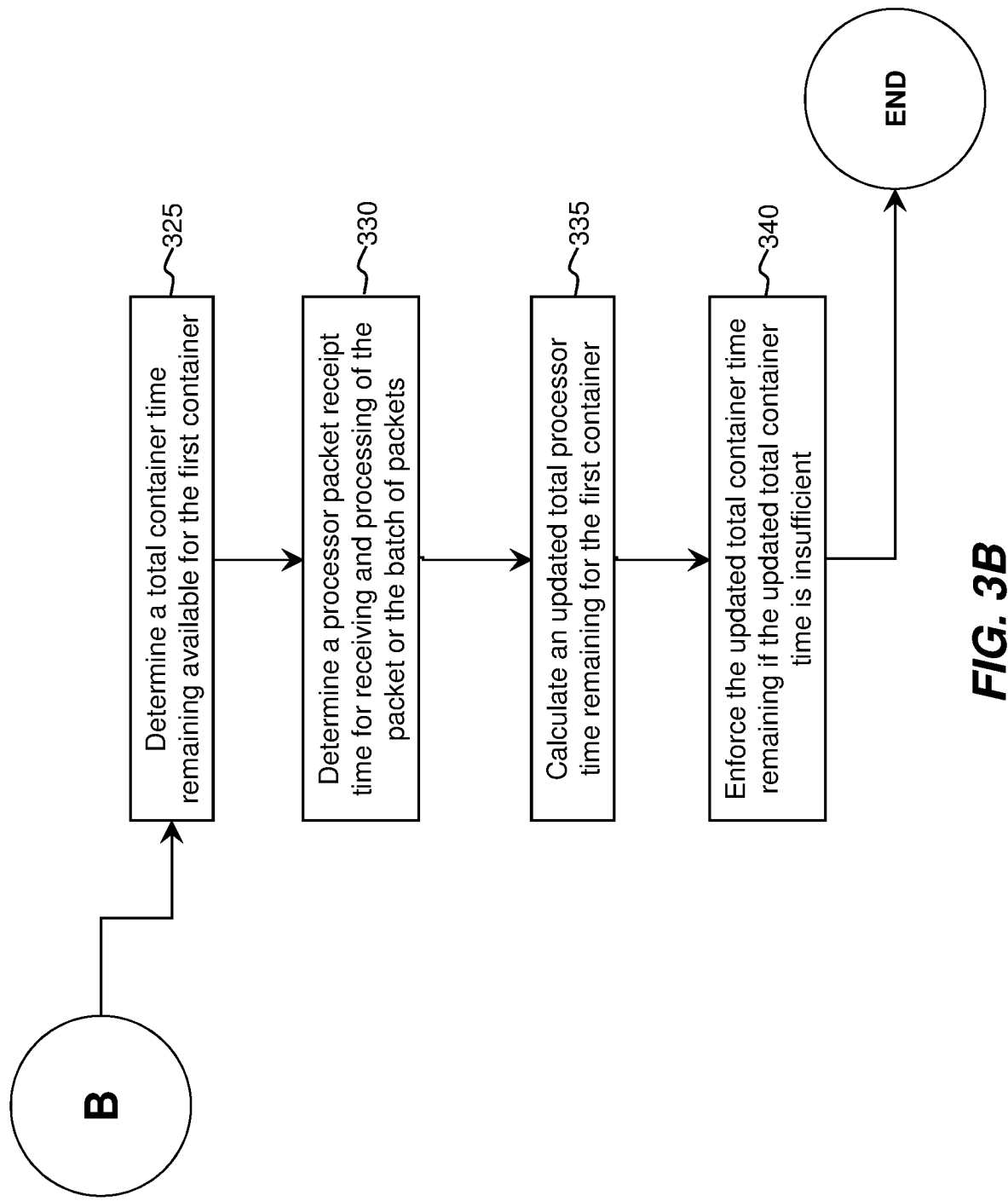

FIGS. 3A and 3B are a flowchart depicting operational steps that a hardware component, multiple hardware components, and/or a hardware appliance may execute, in accordance with an embodiment of the invention. As shown in FIG. 3A, at step 305 cloud computing platform 120 executes a process 225 residing within a second container 125. At step 310, the cloud computing platform 120 receives an interrupt on behalf of a first container 122 when the process 225 in the second container 125 is executing. The interrupt is processed by interrupt processing unit 245, in conjunction with other aspects of the operating system 126 of the cloud computing platform 120. The interrupt indicates receipt of a subsequent packet or batch of packets on behalf of the first container 122. The interrupt may be requested by the process 223 executing within the first container 122. At step 315, the operating system 126 of the cloud computing platform 120 pauses execution of the process 225 executing within the second container 125. At step 320, the cloud computing platform 120 switches execution to process the interrupt to receive via the network stack 127 the subsequent packet or batch of packets on behalf of the first container 122.

Continuing in FIG. 3B, at step 325 total container time remaining available for the first container 122 to execute in the environment 100 is determined by the container time accounting unit 241. The cloud computing platform 120 may utilize a multicore processor. At step 330, the container time accounting unit 241 in conjunction with the interrupt processing unit 245 determines the processor packet receipt time for receiving and processing of a packet or batch of packets via the network stack 127 associated with the cloud computing platform 120. Alternately, the container time accounting unit 241 may directly determine the processor packet receipt time for receiving and processing the subsequent packet or batch of packets directly. At step 335, an updated total container time remaining is calculated by the container time accounting unit for 241 for the first container 122, accounting for the processor packet receipt time. At step 340, the container time enforcement unit 247 enforces the updated total container time remaining by dropping a subsequent packet or batch of packets received at the network stack if the updated total container time remaining is insufficient.

Figure 4:
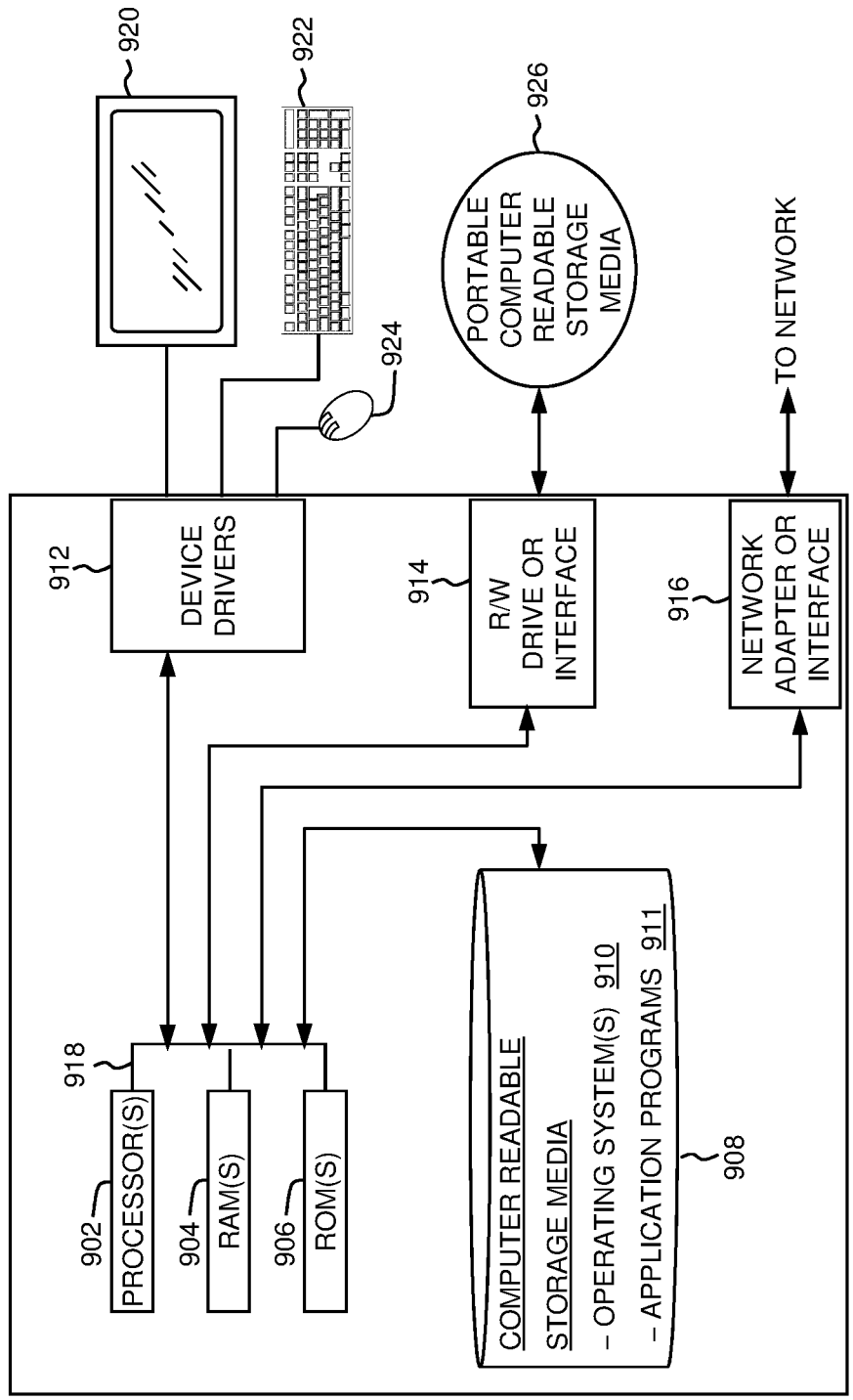
FIG. 4 depicts a block diagram of components of cloud computing platform and/or client, in accordance with an embodiment of the present invention.

FIG. 4 depicts a block diagram of components of cloud computing platform 120 and/or client 140 within an environment for accounting and enforcing non-process execution by container-based software receiving data over a network 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Cloud computing platform 120 and/or client 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment for accounting and enforcing non-process execution by container-based software receiving data over a network 100, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Cloud computing platform 120 and/or client 140 may also include a R/W drive or interface 914 to read from and write to one or more portable computer readable storage media 926. Application programs 911 on cloud computing platform 120 and/or client 140 may be stored on one or more of the portable computer readable storage media 926, read via the respective R/W drive or interface 914 and loaded into the respective computer readable storage media 908.

Cloud computing platform 120 and/or client 140 may also include a network adapter or interface 916, such as a TCP/IP adapter card or wireless communication adapter (such as a 4G wireless communication adapter using OFDMA technology). Application programs 911 on cloud computing platform 120 and/or client 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Cloud computing platform 120 and/or client 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
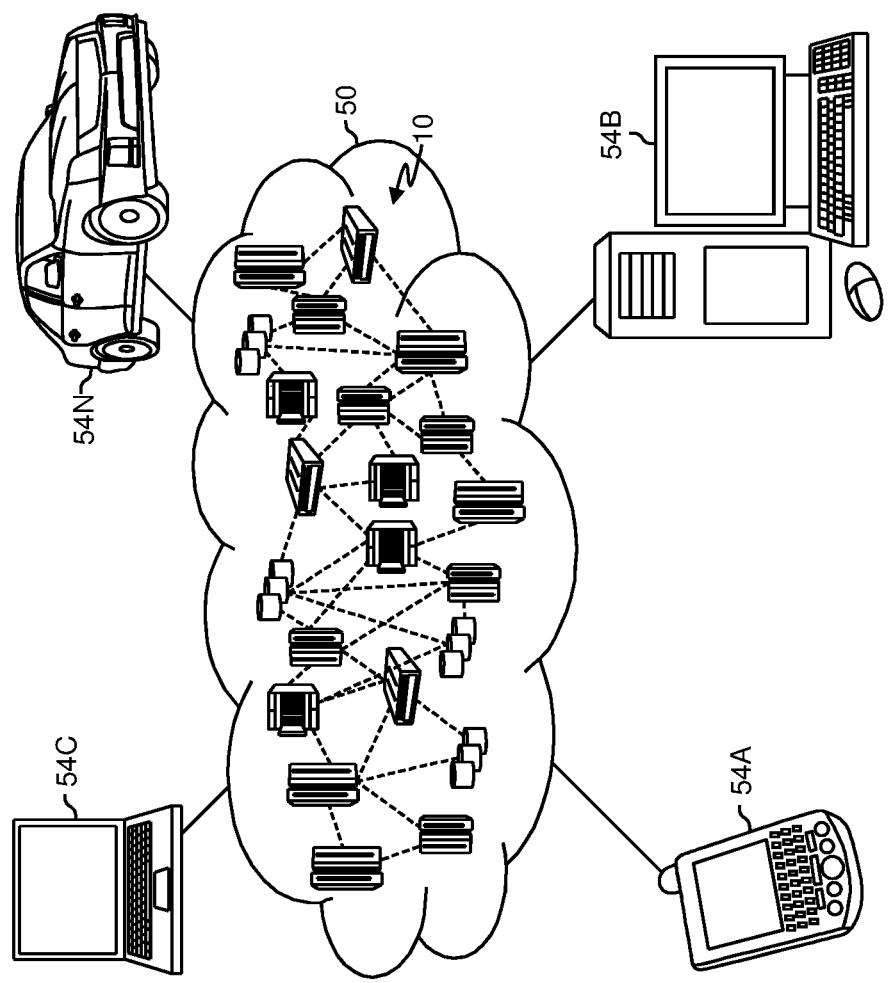
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
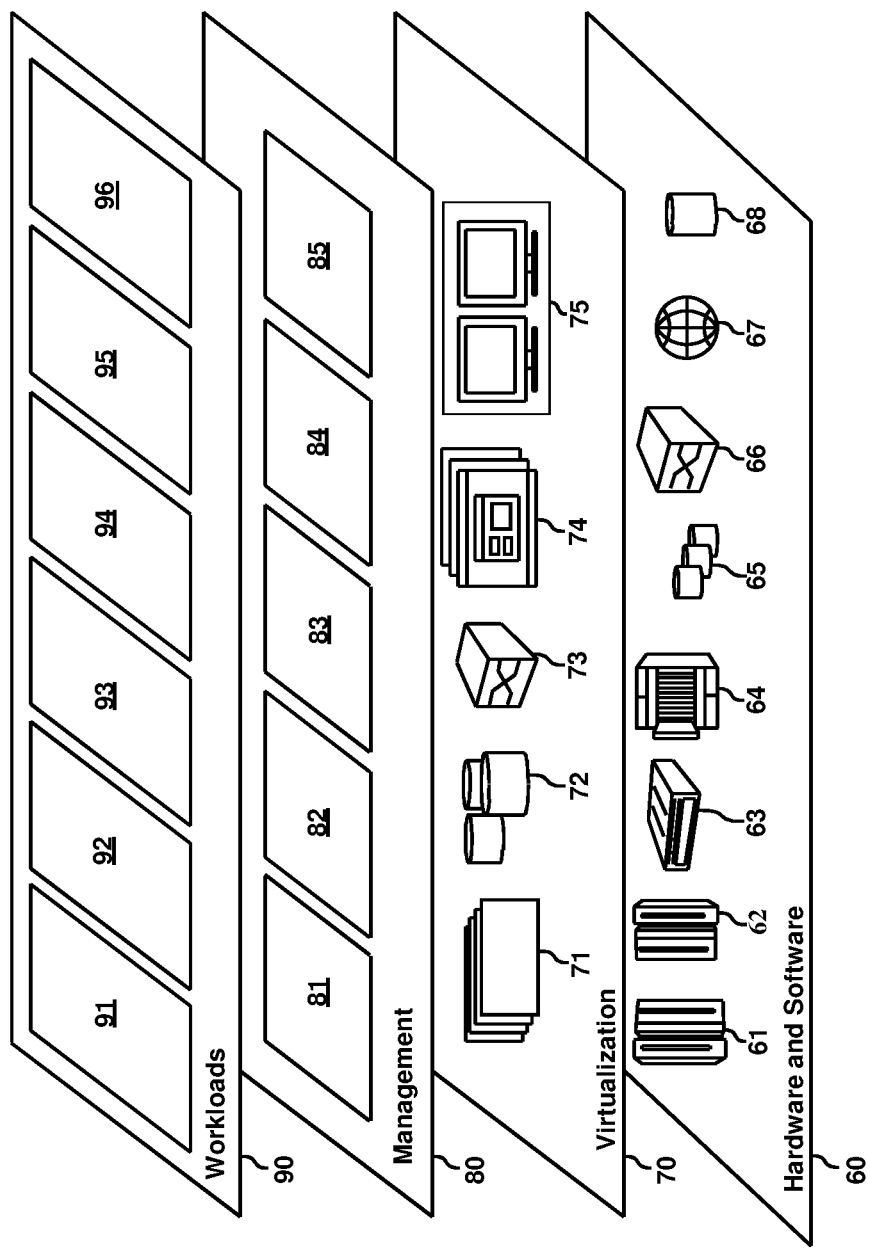
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment for accounting and enforcing non-process execution by container-based software receiving data over a network 96.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of utilizing a computing device to determine and enforce limits on cloud computing containers receiving data over a network, the method comprising:

receiving, by the computing device, an interrupt on behalf of a first container when the computing device is executing a process residing within a second container, the interrupt indicating receipt of a subsequent packet or a batch of packets at a network stack for the first container, the interrupt causes execution of the process residing in the second container to pause and switch execution to process the interrupt to receive the subsequent packet or the batch of packets on behalf of the first container;

determining a total container time remaining available for the first container to execute in a computing environment;

determining a processor packet receipt time for receiving and processing of the subsequent packet or the batch of packets via the network stack associated with the computing device;

calculating an updated total container time remaining for the first container accounting for the processor packet receipt time; and enforcing the updated total container time remaining by dropping the subsequent packet or the batch of packets received at the network stack when the updated total container time remaining is insufficient.

2. The method of claim 1, wherein the subsequent packet or batch of packets are received at a ring buffer of the network stack and, when the updated container time remaining is insufficient, the subsequent packet or batch of packets are overwritten at the ring buffer before processing by the network stack via disabling of polling from a kernel.

3. The method of claim 1, wherein the subsequent packet or batch of packets are processed by a kernel thread of the computing environment responsible for processing interrupts on behalf of the first container, and when calculating the updated container time remaining for the first container the subsequent packet or batch of packets processed by the kernel thread are accounted for.

4. The method of claim 1, wherein the processor packet receipt time is determined according to selectively one of the following: a per-packet basis, a sampling per-queue basis, a per-flow basis, a per-container basis, a per-core basis, and a per-tenant basis.

5. The method of claim 1, wherein the processor packet receipt time for receiving and processing of the packet or the batch of packets comprises a cost per packet and a fixed cost associated with processing network traffic.

6. The method of claim 1, wherein calculating the updated total container time remaining occurs after the processor packet receipt time is determined and before the subsequent packet or batch of packets is received on behalf of the first container.

7. The method of claim 1, wherein when determining the processor packet receipt time for receiving and processing of the packet or the batch of packets, the computing device utilizes recorded time for a receipt of a previously received batch of packets, divides the recorded time for the receipt by a number of the previously received packet or batch of packets, and generates a per packet estimated receipt time to determine the processor packet receipt time.

8. The method of claim 1, wherein enforcing the updated container time remaining further comprises transmitting a notification to a transmitter of the packet or the batch of packets, the notification indicating to the transmitter to slow or stop further transmission until the updated total container time remaining is refilled.

9. A computer program product using a computing device to determine and enforce limits on cloud computing containers receiving data over a network, the computer program product comprising:

one or more non-transitory computer-readable storage media and program instructions stored on the one or more non-transitory computer-readable storage media, the program instructions, when executed by the computing device, cause the computing device to perform a method comprising:

receiving, by the computing device, an interrupt on behalf of a first container when the computing device is executing a process residing within a second container, the interrupt indicating receipt of a subsequent packet or a batch of packets at a network stack for the first container, the interrupt causes execution of the process residing in the second container to pause and switch execution to process the interrupt to receive the subsequent packet or the batch of packets on behalf of the first container;

determining a total container time remaining available for the first container to execute in a computing environment;

determining a processor packet receipt time for receiving and processing of the subsequent packet or the batch of packets via the network stack associated with the computing device;

calculating an updated total container time remaining for the first container accounting for the processor packet receipt time; and enforcing the updated total container time remaining by dropping the subsequent packet or the batch of packets received at the network stack when the updated total container time remaining is insufficient.

10. The computer program product of claim 9, wherein the subsequent packet or batch of packets are received at a ring buffer of the network stack and, when the updated container time remaining is insufficient, the subsequent packet or batch of packets are overwritten at the ring buffer before processing by the network stack via disabling of polling from the kernel.

11. A computer system using a computing device to determine and enforce limits on cloud computing containers receiving data over a network, the computer program products comprising:

one or more computer processors;

one or more computer-readable storage media;

program instructions stored on the computer-readable storage media for execution by at least one of the one or more processors, the program instructions comprising:

program instructions to receive by the computing device an interrupt on behalf of a first container when the computing device is executing a process residing within a second container, the interrupt indicating receipt of a subsequent packet or a batch of packets at a network stack for the first container, the interrupt causes execution of the process residing in the second container to pause and switch execution to process the interrupt to receive the subsequent packet or the batch of packets on behalf of the first container;

program instructions to determine a total container time remaining available for the first container to execute in a computing environment;

program instructions to determine a processor packet receipt time for receiving and processing of the subsequent packet or the batch of packets via the network stack associated with the computing device;

program instructions to calculate an updated total container time remaining for the first container accounting for the processor packet receipt time; and program instructions to enforce the updated total container time remaining by dropping the subsequent packet or the batch of packets received at the network stack when the updated total container time remaining is insufficient.

12. The computer system of claim 11, wherein the program instructions to enforce the updated container time remaining further comprise program instructions to transmit a notification to a transmitter of the packet or the batch of packets, the notification indicating to the transmitter to slow or stop further transmission until the updated total container time remaining is refilled.

13. The computer system of claim 11, wherein when determining the processor packet receipt time for receiving and processing of the packet or the batch of packets, the computing device utilizes recorded time for a receipt of a previously received batch of packets, divides the recorded time for the receipt by a number of the previously received packet or batch of packets, and generates a per packet estimated receipt time to determine the processor packet receipt time.

14. The computer system of claim 11, wherein the processor packet receipt time for receiving and processing of the packet or the batch of packets comprises a cost per packet and a fixed cost associated with processing network traffic.

15. The computer program product of claim 9, wherein the subsequent packet or batch of packets are processed by a kernel thread of the computing environment responsible for processing interrupts on behalf of the first container, and when calculating the updated container time remaining for the first container the subsequent packet or batch of packets processed by the kernel thread are accounted for.

16. The computer program product of claim 9, wherein enforcing the updated container time remaining further comprises transmitting a notification to a transmitter of the packet or the batch of packets, the notification indicating to the transmitter to slow or stop further transmission until the updated total container time remaining is refilled.

17. The computer system of claim 11, wherein the processor packet receipt time is determined according to selectively one of the following: a per-packet basis, a sampling per-queue basis, a per-flow basis, a per-container basis, a per-core basis, and a per-tenant basis.

* * * * *